Oct. 16, 1951     G. NEUMANN ET AL     2,571,927
ELECTROLYTIC CELL, AND IN PARTICULAR ALKALINE CELL
Filed Jan. 29, 1949     2 SHEETS—SHEET 1
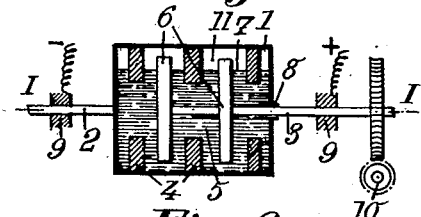
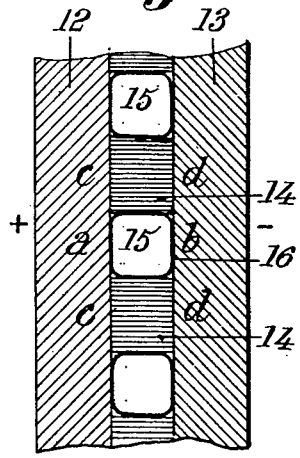
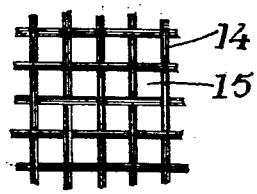
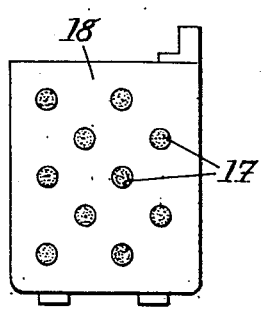
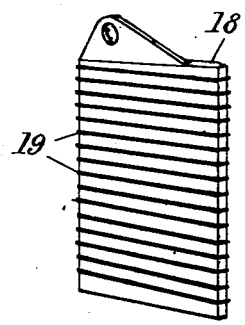
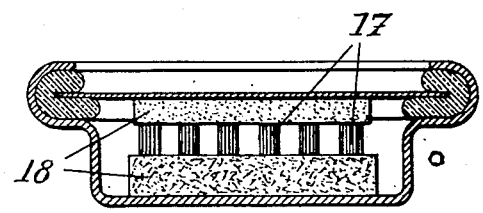
INVENTORS
GEORG NEUMANN AND USCHA GOTTESMANN
BY
AGENT Oct. 16, 1951         G. NEUMANN ET AL         2,571,927

ELECTROLYTIC CELL, AND IN PARTICULAR ALKALINE CELL

Filed Jan. 29, 1949                             2 SHEETS—SHEET 2

INVENTORS
GEORG NEUMANN AND USCHA GOTTESMANN

BY

AGENT

Patented Oct. 16, 1951

2,571,927

UNITED STATES PATENT OFFICE 2,571,927

ELECTROLYTIC CELL AND, IN PARTICULAR, ALKALINE CELL

Georg Neumann and Uscha Gottesmann, Paris, France, assignors to "Bureau Technique Gautrat," S. A. R. L., Paris, France, a society of France Application January 29, 1949, Serial No. 73,608
In France December 20, 1947

5 Claims. (Cl. 136—6)

The present invention relates to electrolytic cells such as storage batteries, and in particular to alkaline cells.

One object to our invention is to provide a cell of this kind which is closed in a fluid-tight manner.

It is known that in electroyltic cells, in certain conditions of operation and in particular at the end of charging of a storage battery oxygen and hydrogen are evolved so that, in order to permit the escape of these gases, the inside of the cell must be left in communication with the surrounding atmosphere.

In the copending application, Serial No. 12,785, filed by one of the inventors on March 3, 1948, it has already been proposed to allow the gases thus evolved to come into contact with the electrodes and to combine therewith, which permits of closing the cell in a fluidtight manner without risk of undue overpressure therein.

If the portions of the electrodes with which the evolved gases are in contact remain constantly outside of the electrolyte, these portions become less active after a time, both from the electrical and from the chemical point of view, whereby on the one hand the output of the battery is lowered and, on the other hand, combination of the evolved gases with the material of the electrodes is reduced.

In order to avoid this according to a feature of our invention, the portions of the electrodes with which evolved gases are in contact are at least intermittently kept in service, i. e. included in the normal circuit of the electro-chemical phenomena occuring in the electrolytic cell.

Our invention permits of obtaining electrolytic cells and in particular storage batteries, which, for practical purposes, are perfectly fluidtight.

According to still another feature of our invention, in order to obtain constant potential differences, either simple or multiple (such for instance as those necessary for the operation of apparatus including electronic tubes) in electric circuits through which unidirectional currents supplied from a separate source are flowing, we provide, in series in these circuits, at least one fluidtight closed electrolytic cell the electric storage power of which is very low as compared with the current flowing therethrough.

Preferred embodiments of our invention will be hereinafter described with reference to the accompanying drawings, given merely by way of example, and in which:

Fig. 1 shows, in diagrammatic section, a storage battery according to our invention, this battery being rotatable about an axis of symmetry of the electrodes;

Fig. 2 is an enlarged sectional view of a portion of a storage battery made according to another embodiment of the invention, this view showing two electrodes and a separator, between them;

Fig. 3 is a diagrammatical view of a fabric forming a separator according to an embodiment of the invention;

Fig. 4 is an elevational view of a storage battery plate on which small insulating discs have been fixed, according to another embodiment of the invention;

Fig. 5 is a sectional view of a storage battery of flat shape, made according to the invention;

Fig. 6 is an elevational view of a storage battery plate on which has been wound a wire acting as a separator, according to another embodiment of the invention;

Figure 7:
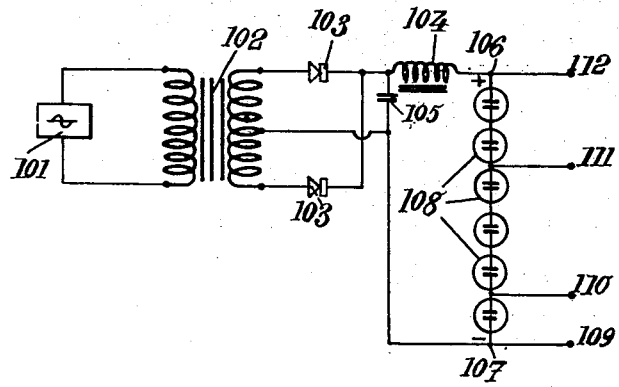
Fig. 7 shows a diagrammatically a device for supplying several direct voltages through fluidtight closed electroyltic cells, according to the invention.

According to a first embodiment a portion of the electrodes is caused to emerge periodically from the electrolyte. The emerged portions combine with the surrounding gases. Then they are again immersed in the electrolyte, which thus reintroduces these portions into the circuit of the electro-chemical exchanges.

Advantageously, we build up in the following manner a storage battery in which certain portions of the electrodes are made successively to emerge from the electrolyte (Fig. 1).

A wholly and constantly fluidtight storage battery vessel, for instance of cylindrical shape, is made rotatable about an axis I, I. A shaft 2 extending along said axis is electrically connected with one of the two groups of electrodes, for instance the negative group. Another shaft 3, extending along the same axis is connected to the second group of electrodes, in this case the positive group. Each negative electrode 4 is made of annular shape, and through its center passes the portion of shaft 3 that carries the positive electrodes, without electric contact. These positive electrodes are made in the form of circular discs 6 interposed between the negative electrodes, and concentric with the above mentioned shaft 3, to which they are electrically connected. Electrolyte is present in the vessel, in such manner that, axis I, I being horizontal, a portion of the electrodes emerge above level 7. Shaft 3 is insulated, if necessary, from vessel 1 by means of a fluidtight ring 8.

Shafts 2 and 3 are connected respectively with the positive and negative terminals through suitable contacts 9 and the storage battery thus constituted is rotated as a whole, by means of any suitable system, diagrammatically illustrated in this case by an endless screw 10, in mesh with a toothed wheel fixed to the shaft.

In these conditions, the successive portions of each electrode, during charging, emerge from the electrolyte; the gases collected at the upper portion 11 of the storage battery recombine respectively with the positive and negative active materials of said electrodes. Then said successive portions of each electrode are again immersed in the electrolyte, while the electrochemical cycle of the charge, which has proceeded in the meantime, is re-established on the portions above considered.

According to another embodiment, the evolved gases are allowed to come into contact with portions of the electrodes, while leaving said portions also in contact with the electrolyte.

For this purpose, we may provide devices which permit of producing phenomena analogous to those hereinafter described with reference to Fig. 2.

A positive plate or anode 12 is separated from a negative plate or cathode 13 by a structure of checkered or analogous kind, i. e. including liquid filled portions 14, i. e. portions retaining the electrolyte, for instance by capillarity, whereby the gases cannot have access thereinto, and hollow portions or recesses 15. The dimensions of this checkered structure may vary within wide limits, provided that the filled portions retain the electrolyte as above stated and, that, on the other hand, a film or layer 16 of electrolyte is retained by surface tension in the recesses in contact with the electrodes.

When the electrodes are more or less immersed, the liquid filled portions of the separator are disposed (as shown by Fig. 2) in such manner that they prevent the gases evolved by the electrodes to escape. But when the electrolyte is merely retained at places (as for instance at 17 on Fig. 4) in contact with the electrodes it may be admitted on the contrary that the gases circulate freely in the electrolytic cell.

Anyway, the filled portions of the separator, such as 14 or 17, are advantageously constituted by a spongy material.

Experience teaches that, in a fluidtight storage battery element containing such separators comprising filled portions and hollow portions, the gases produced at the end of the charging period are absorbed and that accordingly we avoid overpressures or operations which might make the use of fluidtight storage batteries inconvenient.

This phenomenon of absorption of the gases may be tentatively explained as follows. Considering zones $c$ and $a$ of a positive plate and zones $d$ and $b$ of a negative plate (Fig. 2) respectively opposite a filled portion 14 and a hollow portion 15 of the separator, it seems that the phenomena may be diagrammatically analyzed as follows:

The hydrogen that is evolved at the negative electrode accumulates in recess 15, until it comes into contact with zone $a$ of the anode, through the fluid film of electrolyte 16. This hydrogen thus reduces a portion of zone $a$; it follows that this zone is brought, for a very short time, to a potential with respect to the electrolyte lower than that of the adjoining zones $c$. But the difference of potential is promptly levelled off, because the whole of zones $a$ and $c$ remains always in the circuit of the electro-chemical exchanges, due to the presence of the film 16 of electrolyte.

Besides, an analogous phenomenon has been taking place on the cathode, concerning the fixation of the oxygen evolved at the anode. Therefore zone $b$ of the cathode has assured potential less negative, with respect to the electrolyte than that of zone $d$. It follows that the opposite zones $a$ and $b$ are so to speak periodically caused to have a potential with respect to the electrolyte lower than that of the adjoining zones $c$ and $d$, but they are quickly restored to the same potential as $c$ and $d$ by the flow of current.

However, it is probable that the phenomena above described as taking place in a fragmentary and successive manner actually occur in a continuous manner, the system thus remaining in dynamic equilibrium.

Thus, the gases evolved by electrolysis are recombined with the electrodes, without the efficiency of said electrodes being reduced. However, the system as a whole may be adjusted in such a manner that, when the charging operation is quite finished, absorption is less than gas production and that the resulting rise of pressure, as well as that which might result from abnormal operation during charging, permits of actuating controlling means for opening the charging circuit, for instance through a part responsive to the effects of said internal pressure.

We may provide in many different ways a separator for storage battery plates working in the manner just above described.

According to a first embodiment, such a separator is constituted by a fabric, resisting to the attack of electrolytes, for instance a nylon fabric. Fig. 3 shows, by way of example, the arrangement of a fabric made of such a fibre.

According to another embodiment (Fig. 4) we provide on an accumulator plate 18 suitably distributed and preferably porous insulating discs or the like 17. These discs act as a separator structure. Fig. 5 shows a flat fluidtight storage battery made according to this embodiment, the separator of which is constituted by small discs 17 fixed, for instance by glueing, on the surface of plates 18.

According to still another embodiment (Fig. 6) a separator according to the invention is constituted by winding around plate 18 non adjoining turns 19 of an insulating thread resisting the attack of the electrolytes but capable of absorbing a certain amount thereof.

Whatever be the embodiment that is used when making use of a fluidtight electrolytic cell according to the invention, account should be taken of the fact that absorption by one of the two electrodes may be slower than the gaseous output of the other electrode. If we call A the electrode the absorption of which risks of being slow as compared to the amount of gas evolved by the opposite electrode B, we may provide against the drawbacks that might result from this fact by giving electrode B a storage power higher than that of electrode A. If, furthermore, electrodes A and B are both in the discharged state at the time of the fluidtight closing of the cell, electrode A, of lower capacity, is charged and evolves gases before the same effects take place on electrode B from which a production of gases difficult to absorb could be feared.

For instance, to constitute an alkaline cadmium-nickel cell, it is advantageous to take into account the fact that the nickel oxide entering into the composition of the positive active material is less easily reduced than the cadmium metal contained in the negative active material is oxidized. Thus we can give the negative electrodes group a storage power substantially higher than that of the positive group. Besides, this solution coincides with other technical necessities inherent in alkaline cells. However, according to our invention, it may be useful to make this difference of storage power between the two groups of electrodes greater than usual.

According to a particular embodiment, we may even provide a true unbalance between the two groups of electrodes and thus constitute an electrolytic cell having advantages as hereinafter described.

For this purpose, we preferably provide a fluidtight alkaline cell such that the negative electrode has a storing power much greater than that of the positive electrode, and furthermore that all the electrodes are in the discharged state at the time of the fluidtight closing of the cell. In the course of the charging of such a cell, the anode, once charged, will give off oxygen, whereas the cathode, still far from being fully charged, will still contain an important proportion of metallic oxide (iron or cadmium oxide for instance) and will give off practically no hydrogen. Consequently, at the end of the charging operation, the oxygen formed at the anode by the whole of the current, oxidizes, according to the invention, the cadmium metal which has been formed simultaneously at the cathode by the same amount of current, whereby the cell is constantly restored to the same electro-chemical state, whatever be the current that flows therethrough.

Consequently, such a cell can advantageously be used as a regulator of voltage, within wide limits of variation of the current that flows therethrough, since in the present case the variation of potential by ohmic resistance is low.

In some cases, it may be advantageous to provide an electrolytic cell according to our invention with safety means entering into play when the pressure inside the cell reaches, for any reason, an inadmissible value. Such safety means may be constituted by a safety valve, or preferably, by a weakening of the wall of the cell envelope at a suitable place, which ensures a predetermined bursting of this envelope when too high pressures are produced.

In the preceding description, the invention has been supposed to be applied especially to the case of electrolytic cells having a storing power relatively high with respect to the current that flows therethrough these cells acting a storage batteries.

However our invention can also be applied to the production of fluidtight electrolytic cells having a low storing power as compared with the current flowing therethrough. Cells of this last mentioned kind are advantageously used, according to a feature of our invention, for obtaining constant potential differences either simple or multiple, in electric circuits through which flow unidirectional currents supplied from a separate source.

If it is desired for instance to provide a device capable of supplying several different direct voltages, we may operate as follows, with reference to Fig. 7. According to a conventional arrangement, we make use of a source 101 of alternating current the voltage of which is modified by means of a transformer 102. Each of the two alternating currents is rectified by means of a rectifier 103 and the pulsating current thus obtained is filtered by means of an inductance coil 104 inserted in series in the circuit and of a condenser 105 in shunt, the middle point of the secondary of transformer 102 being connected with a point of the electric circuit on the other side of the condenser from coil 104. Now according to our invention, we insert, between two points 106 and 107 of the circuit thus constituted, a plurality of fluidtight electrolytic cells 108 in series, the storing power of which is low with respect to the current flowing therethrough. Such cells, when submitted to the passage of current in the suitable direction, yield, across their terminals, after a short "charging period," a difference of potential substantially constant for a given cell, even when the current varies within rather wide limits. By suitably grouping the electrolytic cells connected in series, it is possible to obtain a range of voltages in arithmetic progression. Thus, connections 109, 110, 111 and 112 permit of obtaining all unitary voltages from U to 6U, if U is the difference of potential across the terminals of one of the cells.

If it is desired to make use of unidirectional currents higher than the current admissible for one cell, it suffices to dispose several of these cells in parallel, and this without prejudice of their grouping in series.

Figure 8:
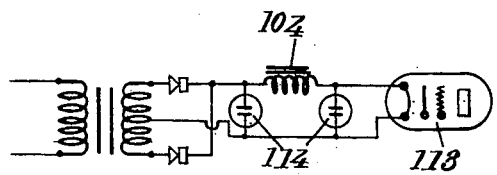
Fig. 8 shows a device for heating a radio tube.

If it is desired to ensure the heating of a tube 103 (Fig. 8), we may use, instead of the conventional filtering condensers, two electrolytic cells 114 or groups of cells in series according to the invention, disposed in shunt on either side of coil 104, itself in series with the filament to be heated. Such an arrangement improves the stability of the voltage supplied across the terminals of the filament.

Figure 9:
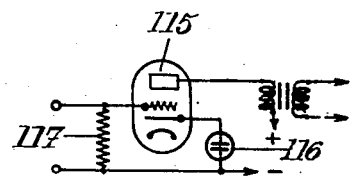
Fig. 9 shows a device for supplying a bias to an amplifier tube.

If, now, it is proposed to provide for the biasing of an amplifying tube 115 (Fig. 9), we may, according to our invention, replace the usual bias means by at least one fluidtight electrolytic cell 116 of the type above referred to, resistance 117 being the grid lead resistance.

In a general manner, while we have, in the above description, disclosed what we deem to be practical and efficient embodiments of the present invention, it should be well understood that we do not wish to be limited thereto as there might be changes made in the arrangement, disposition and form of the parts without departing from the principle of our invention as comprehended within the scope of the appended claims.

What we claim is:

1. An electrolytic cell of the type described comprising a sealed vessel capable of confining under pressure the gases generated therein, and in said vessel a negative electrode, a positive electrode, an immobilized liquid electrolyte between limited areas of the surface of one electrode and the surface of the other electrode, free gas passages through electrolyte-free gas spaces between other areas of opposite surfaces of said electrodes, and a film of the electrolyte on said latter areas, said latter film-covered areas on either electrode causing thereon depolarization and recombination of a substantial amount of the gas developed at the electrode of the opposite polarity.

2. An electrolytic cell as defined in claim 1 wherein the amount of active material in the negative electrode is in substantial excess of the equivalent amount of active material in the positive electrode.

3. An electrolytic cell of the type described comprising a sealed vessel capable of confining under pressure the gases generated therein, and in said vessel a negative electrode, a positive electrode, a separator of electrically non-conductive material between, and in contact with, said electrodes, a liquid electrolyte absorbed by said separator, electrolyte-free gas passages between the electrodes defined by said separator, and a film of the electrolyte covering the openings of said passages in the surface of the electrodes, the film-covered area of the surface of each electrode causing thereon depolarization and recombination of a substantial amount of the gas developed at the electrode of the opposite polarity.

4. An electrolytic cell as defined in claim 3 wherein the separator is a porous fabric made of synthetic polyamide fibers.

5. An electrolytic cell as defined in claim 3 wherein the separator is constituted by a thread wound in turns around at least one of the electrodes.

GEORG NEUMANN.
USCHA GOTTESMANN.

REFERENCES CITED

The following references are of record in the file of this patent:

UNITED STATES PATENTS

| Number | Name | Date |
|---|---|---|
| 316,533 | Fournier | Apr. 28, 1885 |
| 418,748 | Prescott | Jan. 7, 1890 |
| 1,439,036 | Suekoff | Dec. 19, 1922 |
| 2,175,523 | Greger | Oct. 10, 1939 |
| 2,276,188 | Greger | Mar. 10, 1942 |
| 2,462,998 | Ruben | Mar. 1, 1949 |
| 2,511,887 | Vinal | June 20, 1950 |

FOREIGN PATENTS

| Number | Country | Date |
|---|---|---|
| 561,820 | Great Britain | June 6, 1944 |

OTHER REFERENCES

Knowlton, Standard Handbook for Elec. Engrs., 7th ed. (1941), page 2005.

Schleicher, Std. Handbook for Elec. Engrs., 7th ed. (1941), page 2013.